United States Patent [19]

Sasse

[11] Patent Number: 5,388,676
[45] Date of Patent: Feb. 14, 1995

[54] HYDRAULIC DASHPOT FOR MOTOR VEHICLES

[75] Inventor: Herrn T. Sasse, Ennepetal, Germany

[73] Assignee: August Bilstein GmbH & Co. KG, Ennepetal, Germany

[21] Appl. No.: 132,636

[22] Filed: Oct. 6, 1993

[30] Foreign Application Priority Data

Oct. 7, 1992 [DE] Germany .................... 4233650

[51] Int. Cl.6 .................................. F16K 9/46
[52] U.S. Cl. ......................... 188/299; 188/322.11
[58] Field of Search ........... 188/267, 299, 319, 322.11, 188/322.13–322.15, 322.22, 321.11; 267/140.14, 140.15

[56] References Cited

U.S. PATENT DOCUMENTS

| | | | |
|---|---|---|---|
| 4,961,483 | 10/1990 | Yamaoka et al. | 188/299 |
| 5,018,606 | 5/1991 | Carlson | 188/267 |
| 5,054,809 | 10/1991 | Yamaoka et al. | 188/299 X |
| 5,096,025 | 3/1992 | Herberg | 188/299 |
| 5,170,866 | 12/1992 | Ghaem | 188/267 |
| 5,172,929 | 12/1992 | Butsuen et al. | 188/299 X |
| 5,277,281 | 1/1994 | Carlson et al. | 188/322.15 X |

FOREIGN PATENT DOCUMENTS 2637033 3/1990 France ................ 188/299

275927 11/1989 Japan ................ 188/299

*Primary Examiner*—Robert J. Oberleitner
*Assistant Examiner*—Alfred Muratori
*Attorney, Agent, or Firm*—Max Fogiel

[57] ABSTRACT

The invention is a hydraulic dashpot for motor vehicles. It comprises a shock-absorber cylinder and a shock-absorber piston and piston rod. The cylinder accommodates a shock-absorbing fluid. The piston divides the cylinder into two displacement compartments. The piston is connected to the vehicle's body or wheel mass by a neck-and-collar pivot that comprises two components. The first component is a collar. The second is a neck. The neck is preferably rubber and metal. The electric supply lines to one or more sensors and/or one or more variable valves extend outward and are connected to the connecting lines of the processing-and/or-actuating circuit by a plug-and-socket connection. An outer ring has a bore that corresponds with the inside of the cylinder or with the inside of the piston rod for the electric supply lines to extend through. A groove extends at least part-way around the inner surface of the outer ring and accommodates the electric supply lines. The outer ring has another bore through its circumference, through which the electric supply lines extend to the plug-and-socket connection.

8 Claims, 3 Drawing Sheets

HYDRAULIC DASHPOT FOR MOTOR VEHICLES

BACKGROUND OF THE INVENTION

The present invention generically concerns a one-cylinder or two-cylinder hydraulic dashpot for motor vehicles. It comprises a shock-absorber cylinder and a shock-absorber piston and piston rod. The cylinder accommodates a shock-absorbing fluid. The piston divides the cylinder into two displacement compartments. The piston is connected to the vehicle's body or wheel mass by a neck-and-collar pivot that comprises two components. The first component is a collar. The second is a hollow neck. The neck is preferably rubber and metal. The electric supply lines to one or more sensors and/or one or more variable valves extend outward and are connected to the connecting lines of the processing- and/or-actuating circuit by a plug-and-socket connection.

A variable-absorption shock absorber is known from German Patent 2 911 768 C1. The level of absorption is dictated by a bypass in the piston rod. The wires that control the bypass extend through a plug-and-socket connection and into the hollow piston rod. There is an intermediate between the end of the piston rod and a fastener in the form of a neck-and-collar pivot. The intermediate secures the neck-and-collar pivot tight to the piston rod. There is a bore in the intermediate at an angle to the longitudinal axis of the piston rod. The wires that extend from inside the piston rod to the outer surface of the intermediate extend through the bore to a plug-and-socket connection.

There is a drawback to this dashpot. The plug is accommodated in an intermediate below the neck-and-collar pivot. This increases the dead length of the dashpot by the height of the intermediate. It is also difficult to assemble the plug-and-socket connection because the wires leading to the plug must be longer, and the extra length must be accommodated inside the dashpot.

German Patent 3 313 288 C2 describes a variable-absorption dashpot that has the electrical connections for its valves and sensors accommodated in a hollow piston rod and connected by way of a plug-and-socket connection in a cavity in the face of the piston rod with wires leading from a processing and/or actuating circuit. A plug-and-socket connection cannot, however, be accommodated in this position in dashpots that are connected by way of neck-and-collar pivots with the vehicle's body or wheel mass.

SUMMARY OF THE INVENTION

The object of the present invention is to provide a hydraulic dashpot for motor vehicles with at least one neck-and-collar pivot for securing it to the body and/or wheel mass with the following advantages. First, the electric supply lines that extend out of the dashpot are connected in a simple procedure by a plug-and-socket connection to the connecting lines that extend into the processing and/or actuating circuit. Second, the position of the plug-and-socket connection will eliminate the necessity of extending the dashpot's dead length. Finally, the lines and plug-and-socket connection will be extensively protected from damage while the dashpot is being shipped, installed, or operated.

The outer ring of the neck-and-collar pivot in accordance with the invention accordingly has a bore that corresponds with the inside of the shock-absorber cylinder or with the inside of the piston rod. The lines that supply electricity to the sensors or valves extend into the outer ring through the bore. Inside the outer ring they are accommodated by a groove that extends at least part-way around its inner surface until they arrive at another bore. The electric supply lines extend out of the second bore to a plug-and-socket connection.

The bore that the supply lines in one advantageous embodiment extend out of accommodates the component of the plug-and-socket connection that is secured to the supply lines. Associated with the bore in another embodiment is a cylindrical bushing that corresponds with it, that accommodates one or both components of the plug-and-socket connection, and that is preferably welded to the outer ring.

The supply lines can have a covering or molded-on sheath to protect the length accommodated in the groove in the outer ring from physical damage while the neck-and-collar pivot is being assembled.

To facilitate attaching the plug-and-socket connection to the supply lines, they are extended in the groove along the longer section of the circumference of the outer ring, whereby the supply lines are connected in the first stage of assembly to the appropriate component of the plug-and-socket connection, the component is secured in the bore or cylindrical bushing, and the supply lines are introduced into the groove and possibly covered over. This procedure ensures that a long enough section of the supply lines will be available to connect the plug-and-socket connection.

The plug-and-socket connection in accordance with the invention can be employed with either one-cylinder or two-cylinder dashpots. The advantage of the invention is that both the opening in the piston rod or shock-absorber cylinder that the supply lines extend out of and the supply lines themselves are protected from contaminants and physical damage once the rubber-and-metal neck has been inserted into the outer ring without extending the dashpot's dead length.

BRIEF DESCRIPTION OF THE DRAWINGS

Several embodiments of the invention will now be specified with reference to the drawing, wherein.

DESCRIPTION OF THE PREFERRED EMBODIMENTS

Figure 1:
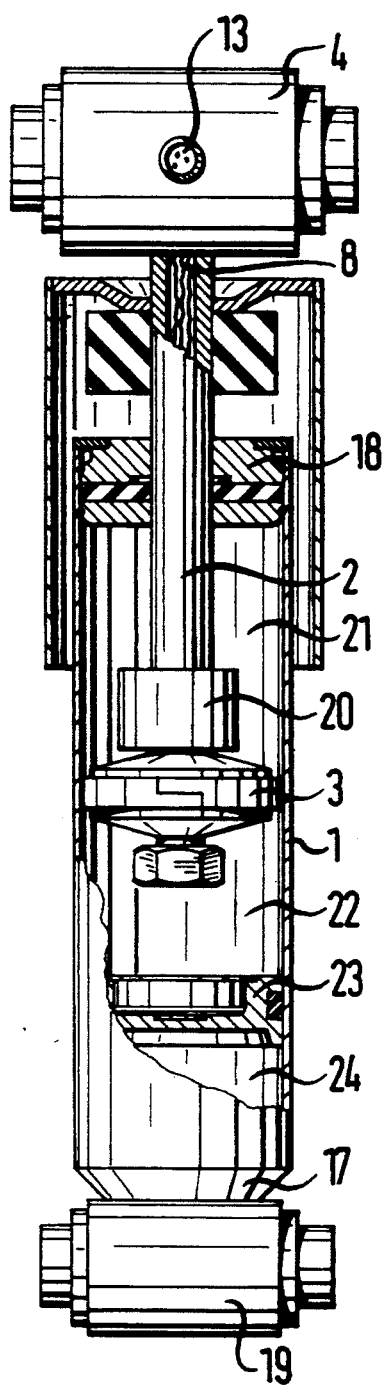
FIG. 1 illustrates a hydraulic dashpot attached by neck-and-collar pivots to a mass suspended with or without springs.

The one-cylinder dashpot illustrated in FIG. 1 consists essentially of a cylinder 1 and piston 3. Cylinder 1 is full of shock-absorbing fluid. It is sealed off at the bottom by a base 17 and at the top by a cap 18. Piston rod 2 slides back and forth inside cylinder 1 on the end of a piston rod 2 that extends tight through an opening in cap 18. Cylinder 1 is secured by a neck-and-collar pivot 19 having a hollow neck of rubber and metal to a wheel mass suspended without springs. Piston rod 2 is secured by another neck-and-collar pivot 4 to a spring-suspended superstructure in the form of the vehicle's body. Piston 3 is provided with a variable bypass 20 shown in block diagram form and containing at least one sensor and/or variable valve. The piston separates cylinder 1 into two displacement compartments 21 and 22. Lower displacement compartment 22 is demarcated by a partition 23. Below partition 23 is a gas-filled chamber 24 that compensates for the increase and decrease in volume that occurs in displacement compartment 22 as piston 3 travels up and down.

The electric supply lines 8 to bypass 20 extend through hollow piston rod 2 and neck-and-collar pivot 4 to plug 13. Once the dashpot has been installed in the vehicle or socket, plug 13 will be connected to the connecting lines to the unillustrated processing and/or actuating circuits.

If the variable dashpot has sensors that sense for example the position of the sliding obstructor in bypass 20, their electric supply lines can also extend out to the processing circuit through the aforesaid plug-and-socket connection.

If the motor that actuates the bypass and/or the sensors is accommodated in the bottom of the dashpot's cylinder the electric supply lines can extend out through neck-and-collar pivot 19.

Figure 2:
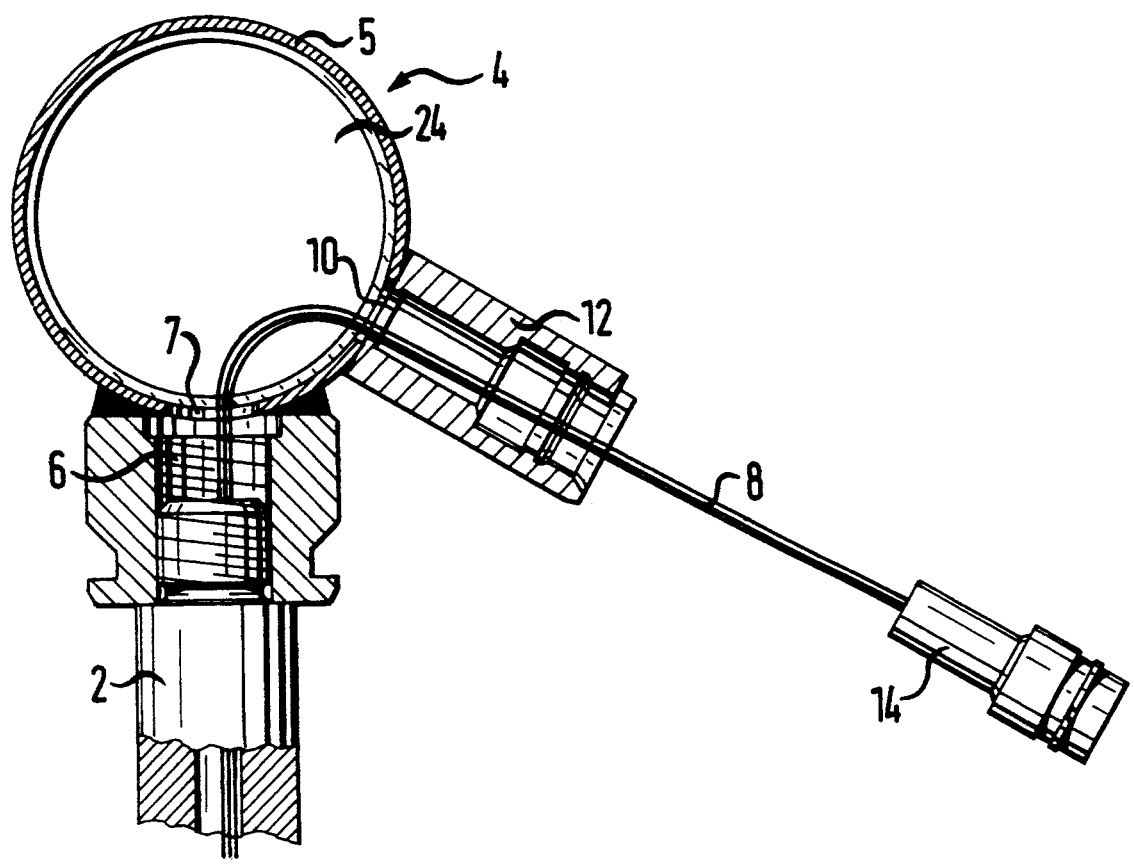
FIG. 2 illustrates how the plug-and-socket connection is accommodated in the outer ring.

FIG. 2 illustrates the plug-and-socket connection installed in the neck-and-collar pivot 4 connected to piston rod 2. Outer ring 5 has for this purpose a bore 7, through which the electric supply lines 8 extending out of hollow piston rod 2 extend into the interior 24 of neck-and-collar pivot 4. An additional bore 10 is accommodated in outer ring 5 at an acute angle to the axis of piston rod 2. Bore 10 corresponds with a cylindrical bushing 12 for the purpose of accommodating socket 14. The electric supply lines 8 that extend out of the inside 6 of piston rod 2 extend out through bores 7 and 10 and are secured to socket 14.

Figure 3:
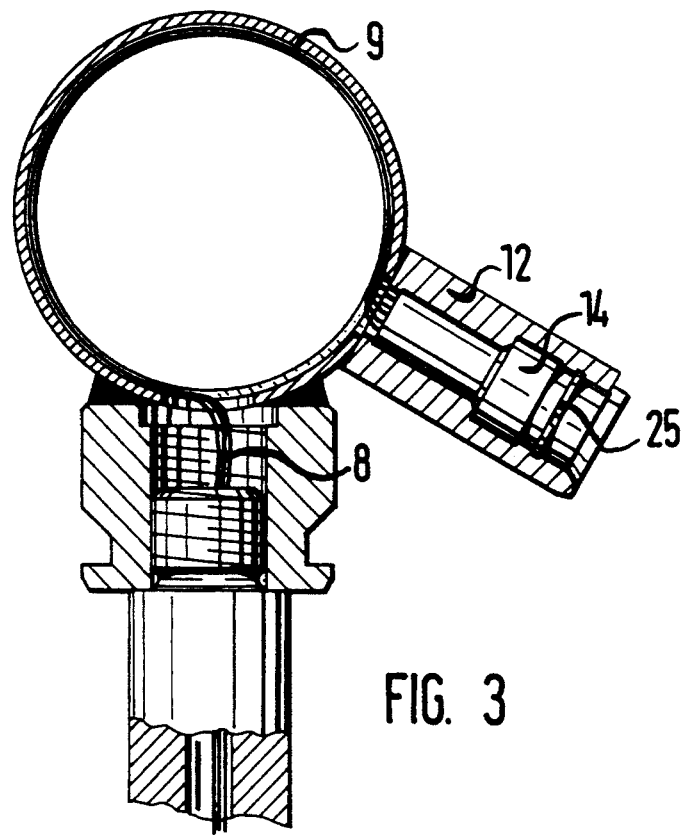
FIG. 3 illustrates the finished plug-and-socket connection.
Figure 3A:
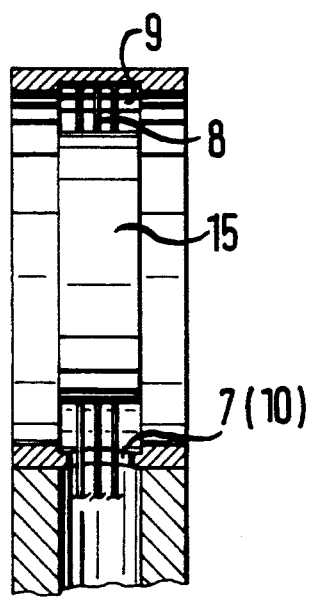
FIG. 3a is a section through the outer ring.

Socket 14 is accordingly, as will be evident from FIG. 3, secured by an interlocking connection 25 in cylindrical bushing 12. Furthermore, electric supply lines 8 extend along a groove 9 in the inner surface of outer ring 5 and can if necessary be protected from external hazards or physical damage by a covering 15 (FIG. 3a).

I claim:

1. A hydraulic dashpot for motor vehicles having a vehicle body and a wheel mass, comprising: a shock-absorber cylinder and a shock-absorber piston and piston rod movable within said cylinder; shock absorbing fluid in said cylinder, said piston dividing said cylinder into two displacement compartments; a neck-and-collar pivot connecting said piston to one of said vehicle body and said wheel mass; said neck-and-collar pivot comprising two components, a first one of said components being a collar and a second one of said components being a hollow neck of rubber and metal; electric supply lines to at least one sensor and at least one variable valve extending outward and being connected to connecting lines of a processing and actuating circuit by a plug-and-socket connection; an outer ring having a first bore corresponding with the inside of said cylinder or with the inside of said piston rod for the electric supply lines to extend therethrough; a groove extending at least partly around an inner surface of said outer ring and receiving said electric supply lines; said outer ring having a second bore through a circumference of said outer ring, said electric supply lines extending through said second bore to said plug-and-socket connection.

2. A hydraulic dashpot as defined in claim 1, wherein said second bore receives one of a plug or a socket of said plug-and-socket connection fastened to said electric supply lines.

3. A hydraulic dashpot as defined in claim 1, including a cylindrical bushing on an outer circumference of said outer ring and corresponding with said second bore for receiving one of a plug or a socket of said plug-and-socket connection.

4. A hydraulic dashpot as defined in claim 3, wherein said cylindrical bushing is welded to said outer ring.

5. A hydraulic dashpot as defined in claim 3, wherein said cylindrical bushing receives the plug fastened to said electrical supply lines.

6. A hydraulic dashpot as defined in claim 3, wherein said cylindrical bushing receives the socket fastened to said electric supply lines.

7. A hydraulic dashpot as defined in claim 1, including a covering for said electric supply lines in said groove.

8. A hydraulic dashpot as defined in claim 1, wherein said electric supply lines in said groove extend over a section that is more than half the circumference of said outer ring.

* * * * *